United States Patent [19]

Ankeny

[11] 3,759,547

[45] Sept. 18, 1973

[54] DETACHABLE HITCH

[76] Inventor: V. Scott Ankeny, 216 N. Circle Dr., Blue Earth, Minn. 56013

[22] Filed: June 20, 1972

[21] Appl. No.: 264,538

[52] U.S. Cl. .......... 280/491 E, 280/106 T, 280/495
[51] Int. Cl. ............................................. B60d 1/14
[58] Field of Search ...................... 280/24 A, 106 T, 280/491, 495

[56] References Cited
UNITED STATES PATENTS

| 3,501,169 | 3/1970 | Nutt | 280/491 ER |
| 2,976,060 | 3/1961 | Barden | 280/491 ER |
| 2,869,890 | 1/1959 | Benning | 280/491 E X |

FOREIGN PATENTS OR APPLICATIONS

| 280,687 | 1/1967 | Australia | 280/491 |

Primary Examiner—Leo Friaglia
Assistant Examiner—Randall A. Schrecengost
Attorney—Jack W. Wicks et al.

[57] ABSTRACT

A detachable hitch for use on an elongated frame including a front portion formed of an angled interconnection of two load bearing members and a rear portion formed of two additional load bearing members in angled relation, the front and rear portions interconnected by overlapping plates attached to the respective portions, with the front portion supporting a towing device and the rear portion interconnected with longitudinal load bearing members of the frame to thus form a structurally sound hitch yet allow detachability of the front portion from the rear portion by the separation of the connection plates.

5 Claims, 4 Drawing Figures

PATENTED SEP 18 1973 3,759,547
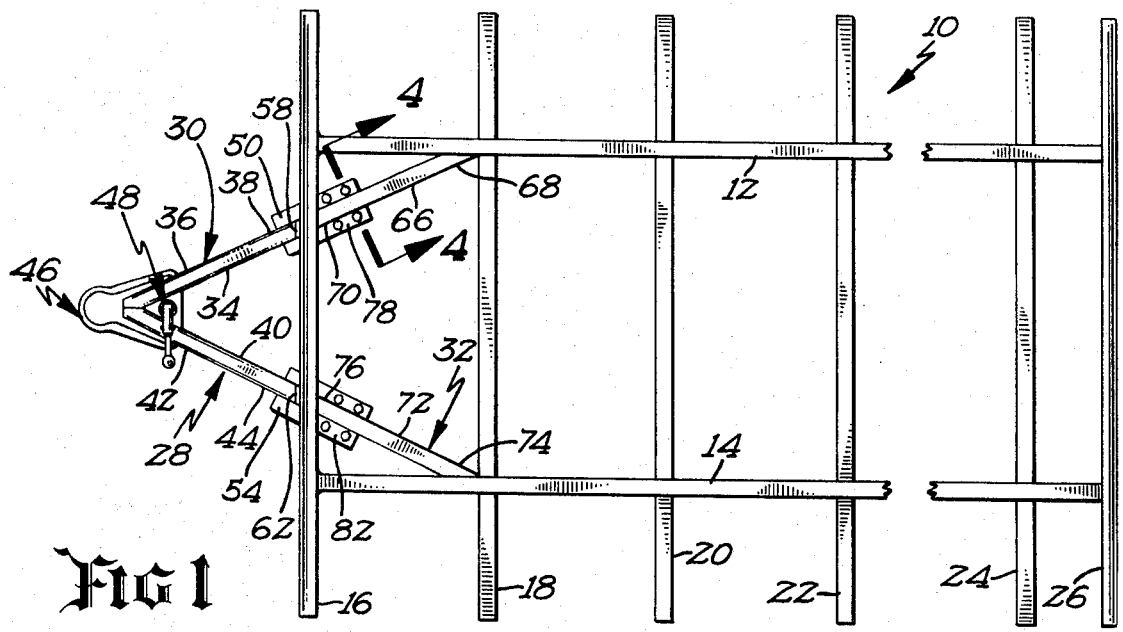
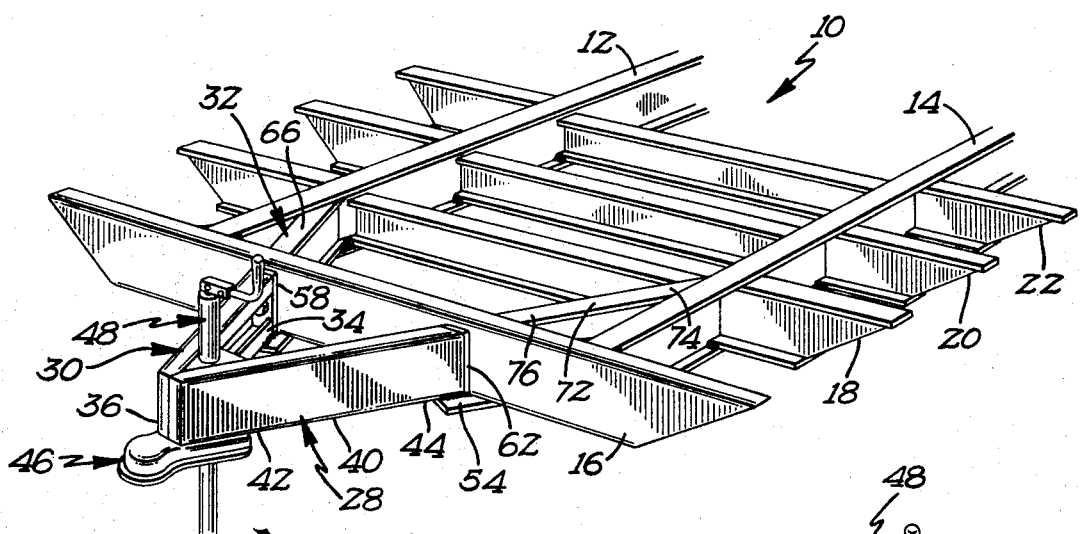
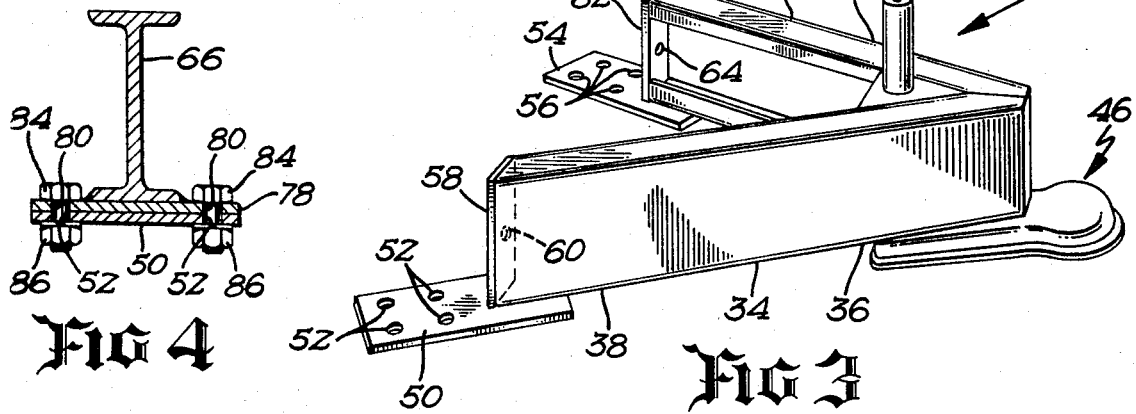

DETACHABLE HITCH

BACKGROUND

The present invention relates to a hitch and more specifically to a detachable hitch.

With the increasing popularity of mobile homes, under-carriages or frames for supporting such mobile homes have received increased attention. Since, by design, these mobile homes can be moved or transported from one location to an other, many if not all of the frames supporting the mobile homes include a hitch to allow connection to a source of motive power.

When the mobile home is to remain on the same site for an extended length of time, however, it is often undesirable to have the travel hitch projecting from the front portion of the frame. Thus, a detachable or removable hitch is desirable.

SUMMARY

The present invention provides a detachable frame hitch of simple and yet effective design.

The detachable hitch of the present invention is specifically arranged for use with elongated frames arranged to carry heavy loads such as mobile homes and having at least two longitudinal, main, support members extending the length of the frame and several transverse cross members of non load bearing capacity. A preferred embodiment of such a hitch includes: a first set of load bearing members angled with respect to one another and joined at one end to support a ball; a first set of connection plates attached to the first set of load bearing members; a second set of load bearing members angled with respect to one another and attached to the main longitudinal support members of the frame to extend toward the front of the frame and abutt the first set of load bearing members with a front cross member interposed between the first and second sets of members; and a second set of connection plates connected to the second set of load bearing members and arranged to overlie and interconnect with the first set of connection plates attached to the first load bearing members to firmly and immovably connect the two sets of load bearing members into a single hitch bypassing the light non load bearing cross member. The hitch of the present invention then relies for support on the main longitudinal support members of the frame yet allows complete removability of the front portion of the hitch including the first set of load bearing members by the separation of the connection plates.

It is thus an object of the present invention to provide a novel detachable hitch.

It is a further object of the present invention to provide a novel detachable hitch for use with an elongated frame.

It is a further object of the present invention to provide a novel detachable hitch capable of bearing heavy loads.

It is a further object of the present invention to provide a novel hitch which can be detached by the separation of plates connected to the respective members of the hitch.

These and further objects and advantages of the present invention will become clearer in the light of the following detailed description of an illustrative embodiment of this invention described in connection with the drawings.

DESCRIPTION OF THE DRAWINGS

FIG. 1 shows a broken, top view of an elongated frame, such as may be used with a mobile home, showing the interconnection of the detachable hitch of the present invention.

FIG. 2 shows a front perspective view of the frame of FIG. 1.

FIG. 3 shows a side perspective view of the front portion of the detachable hitch of the present invention as separated from a frame.

FIG. 4 shows a cross-sectional view according to section lines 4—4 in FIG. 1 to illustrate the interconnection between the front and rear portions of the detachable hitch of the present invention.

DESCRIPTION

In the figures, a frame is shown and generally designated 10. Frame 10 represents a broad range of frames which are generally elongated and arranged for supporting heavy loads. A particular example of this type of frame is a frame arranged to support a mobile home. Frame 10 includes two longitudinal, load support, main members 12 and 14 which extend substantially the length of the frame in a common plane. Twelve inch I-beams have been found to perform successfully as members 12 and 14. Frame 10 further includes a plurality of cross members, designated 16, 18, 20, 22, 24 and 26, of light gauge metal not having substantial load bearing capacity and arranged transverse to the main members 12 and 14. Cross members of 10 to 14 gauge materal have operated successfully.

It will be noted that the frame 10 shown in FIG. 1 is represented as broken in the center to avoid the unnecessary repetition of cross members. That is, a preferred embodiment of frame 10 is 66 feet, 5 inches from cross member 16 to cross member 26 for a 70 foot frame. Unnecessary repetition has been excluded by use of broken main members 12 and 14. It will of course be recognized that this broken technique is used merely for ease of description.

Attached to the front of frame 10 is a detachable hitch according to the present invention and generally designated 28. Hitch 28 includes a front portion generally designated 30, best shown in FIG. 3, and a rear portion generally designated 32.

Front portion 30 of hitch 28 includes a first longitudinal, load bearing, support member 34 having a first end 36 and a second end 38. Front portion 30 further includes a second longitudinal load bearing, support member 40 having a first end 42 and a second end 44. Members 34 and 40 are shown in the form of channel iron. The first and second members 34 and 40 are interconnected in a generally horizontal plane, the plane of main members 12 and 14 of frame 10, with their first ends 36 and 42 connected together in a manner to project forwardly of the frame. The second ends 38 and 44 of the first and second members 34 and 40 are separated, angled with respect to one another and arranged to lie adjacent the frontmost cross member 16 of frame 10.

A towing device, generally designated 46, in the form of a standard inverted coupler is attached to the interconnection of the first ends 36 and 42 of the first and second members 34 and 40. A conventional crank-type leveler designated 48 is also shown as connected to the interconnection of the first ends 36 and 42 of first and second members 34 and 40.

A first connection plate 50 is shown as connected to the second end 38 of member 34 adjacent the bottom. As best seen in FIG. 3, connection plate 50 is welded to the second end 38 of member 34 and includes a plurality of apertures 52 therethrough for purposes hereinafter explained. A second connection plate 54 is simillarly connected to second member 40 and includes a plurality of apertures 56.

A bearing plate 58 is shown as having one face welded to the open end of the second end 38 of member 34 to strengthen the open end and provide a pressure spreading surface between end 38 and cross member 16 in the final connection of hitch 28, as will be also explained hereinafter. An aperture 60 is defined within plate 58 to allow the bolting of plate 58 to cross member 16 for vibration prevention and placement stability of hitch 28, as will also be explained hereinafter. A further plate 62 is similarly connected to second end 44 of member 40 and an aperture 64 is similarly defined therein.

Rear portion 32 of hitch 28 of the present invention includes a third longitudinal, load bearing, support member 66 having a first end 68 welded to member 12 and a second end 70 extending forwardly of the frame 10 in the plane of main members 12 and 14 with the second end 70 terminating adjacent the second end 38 of first member 34 but on the opposite side of front cross member 16. End 70 is then welded to cross member 16. Further, rear portion 32 includes a fourth longitudinal, load bearing, support member 72 having a first end 74 welded to main frame support member 14 in a manner to cause a second end 76 of fourth member 72 to extend forwardly of the frame in the plane of main members 12 and 14, angled with respect to third member 66 with the second end 76 of fourth member 72 terminating adjacent the second end 44 of second member 40 but on the opposite side of front cross member 16 from second member 40. End 44 is then welded to cross member 16.

Members 66 and 76 are shown as further I-beams. It will be realized by those skilled in the art that various configurations of load bearing members can be used for members 66, 72 and the remaining members.

OPERATION

The operation of the detachable hitch of the present invention may now be explained. The members 66 and 72 of the second portion are first welded to a longitudinal or main beams 12 and 14 of frame 10 in the angled relationship set out. That is, members 66 and 72 are welded to members 12 and 14, respectively, in a manner that end 70 of member 66 abutts end 38 of member 34 on opposite sides of front cross member 16. Similarly, end 76 of member 76 is arranged to abut end 44 of member 40 on opposite sides of front cross member 16. Ends 70 and 76 are then welded to cross member 16 for placement.

Front portion 30 of hitch 28 is then positioned with connection plate 50 overlying connection plate 78 and connection plate 54 overlying connection plate 82 to thus allow the passage of a plurality of bolts 84 through the aligned apertures within the respective connection plates. That is, bolts 84 pass through the aligned apertures 80 and 52 within overlying connection plates 78 and 50. Bolts 84 further pass through the aligned apertures 84 and 56 in the overlying connection plates 82 and 54.

By the interconnection of their respective connection plates, load bearing member 40 may be interconnected into a single unitary structural member with load bearing member 72. Likewise load bearing member 34 may be structurally interconnected into a single unitary member with load bearing member 66 to thus allow the transferring of forces from the ball connected to the source of motive power for the frame, through the inverted coupler 46, through the first ends of 36 and 42 of first and second members 34 and 40, through interconnection plates 50 and 78 and plates 54 and 82, to the second ends 70 and 76 of third and fourth members 66 and 72, and to the main beams 12 and 14 of frame 10. Thus, the detachable hitch 28 of the present invention transfers forces from the inverted coupler 46 to the main beams 12 and 14 without reliance upon front cross member 16, not generally of load bearing capacity, or any other cross member to form a structurally sound hitch.

Hitch 28 of the present invention further allows the detachability of the front portion 30 from the rear portion 32 by separating the connection plates 50 and 78 and by separating connection plates 54 and 82, generally a simple operation requiring only the loosening of bolts 84 from their respective nuts 86. Further, nuts and bolts are used through the apertures 60 and 64 defined within plates 58 and 62 to connect plates 58 and 62 to front cross member 16. It will be appreciated that these connections are not structural in nature, but are made merely to achieve a vibration and placement stability.

Thus, the hitch of the present invention provides a quickly detachable front portion and yet allows a structurally sound hitch not relying upon the structural integrity of the front cross member 16 or any other cross member which are generally of non load bearing capacity. It will be recognized by those skilled in the art, that the term "load bearing capacity" will relate to the capacity of the frame, and will vary from frame to frame. Thus, load bearing capacity for the purposes of the present invention is defined to relate to the intended load of the frame.

Lastly, since the invention disclosed herein may be embodied in other specific forms without departing from the spirit or general characteristics thereof, the embodiments described herein are to be considered in all respects illustrative and not restrictive. The scope of the invention is indicated by the appended claims, rather than by the foregoing description, and all changes which come within the meaning and range of the equivalency of the claims are intended to be embraced therein.

What is claimed is:

1. A detachable hitch for use with elongated frames having at least two longitudinal, load bearing, support, main members extending substantially the length of the frame in a common plane and a plurality of cross members not having substantial load bearing capacity arranged transverse to the main members, including: a first set of longitudinal load bearing members including a first longitudinal member having first and second ends and a second longitudinal member having first and second ends with the first and second longitudinal members interconnected in a generally horizontal plane with the first ends of the first and second members connected together in a manner arranged to project forwardly of the frame and with the second ends of the first and second members separated, angled with respect to one another, and arranged to lie adjacent the frontmost cross member of the frame; a towing device fixed to the interconnection of the first ends of the first and second members; a first connection plate connected to the second end of the first member adjacent the bottom; a second connection plate connected to the second end of the second member adjacent the bottom; a second set of longitudinal load bearing members including third longitudinal member having first and second ends and a fourth longitudinal member having first and second ends with the first end of the third member arranged to interconnect with a main frame support member in a manner to cause the second end of the third member to extend forwardly of the frame in the plane of the main members with the second end terminating adjacent the second end of the first member but on the opposite side of the front cross member and with the first end of the fourth member arranged to interconnect to the other main frame support member in a manner to cause the second end of the fourth member to extend forwardly of the frame in the plane of the main members, with the second end of the fourth member terminating adjacent the second end of the second member but on the opposite side of the front cross member from the second member; a third connection plate connected to the second end of the third member adjacent the bottom and arranged to overlie the first connection plate connected to the first member and allow the interconnection of the first member and the third member into a single unitary structural member through the interconnection of the third connection plate and the first connection plate to thus allow the transferring of forces from the first end of the first member to the first end of the third member and thus to the main frame support member without reliance upon the front or any other cross member; a fourth connection plate connected to the second end of the fourth member adjacent the bottom and arranged to overlie the second connection plate connected to the second member and allow the interconnection of the second member and the fourth member into a single unitary structural member through the interconnection of the second connection plate and the fourth connection plate to thus allow the transferring of forces from the first end of the second member to the first end of the fourth member and thus to the main frame support member without reliance upon the front or any other cross member to form a structurally sound hitch yet allow the detachability of the first and second members from the third and fourth members by separating the first and third connection plates and the second and fourth connection plates.

2. The detachable hitch of claim 1, wherein the connection plates define apertures therein, with the apertures defined within the first and third connection plates overlying one another and arranged to receive bolts therethrough and the apertures defined within the first and fourth connection plates overlying one another and arranged to receive bolts therethrough to thereby firmly interconnect the first and the third connection plates and the second and the fourth connection plates to form a structurally sound hitch yet allow the detachability of the first and second members from the third and fourth members by the removal of bolts thus separating the first and third connection plates and the second and fourth connection plates.

3. The detachable hitch of claim 2, wherein the towing device comprises a socket arranged to receive a towing ball.

4. The detachable hitch of claim 3, wherein the first and second members comprise channel iron.

5. The detachable hitch of claim 1, wherein the towing device is a socket arranged to receive a towing ball.

* * * * *